June 6, 1967  P. A. STUDER  3,324,370
ELECTRONIC BEAM SWITCHING COMMUTATOR
Filed Oct. 21, 1964  2 Sheets-Sheet 2
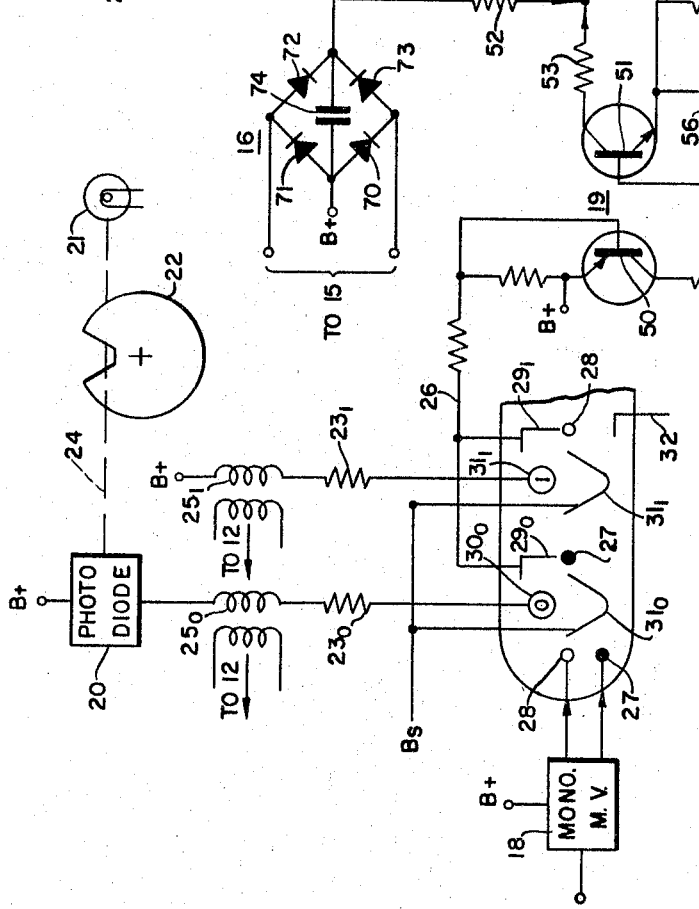
INVENTOR
Philip A. Studer
BY  *Q. H. McCoy*
*Leonard Pruvice*
ATTORNEY

United States Patent Office 3,324,370
Patented June 6, 1967

3,324,370
ELECTRONIC BEAM SWITCHING COMMUTATOR
Philip A. Studer, Silver Spring, Md., assignor to the United States of America as represented by the Administrator of the National Aeronautics and Space Administration
Filed Oct. 21, 1964, Ser. No. 405,629
14 Claims. (Cl. 318—138)

The invention described herein may be manufactured and used by or for the Government of the United States of America for governmental purposes without the payment of any royalties thereon.

This invention relates to an improved brushless motor and more particularly to a DC motor which utilizes an electron beam switching tube as a commutator.

In many satellite applications, the only available energy within the satellite itself is derived either from electrochemical cells or from solar cells. Thus, a direct current motor which will operate from these DC sources is desirable in order to drive various mechanisms within the satellite, such as elements of tape recorders. Since satellites operate in a vacuum environment, any physical contact between the rotor and brushes of the stator of such a motor tends to cause arcing in addition to the inherent frictional losses. Therefore, it is desirable that the commutation process be accomplished without physical contact or by what is referred to as electronic commutation.

Prior to the present invention, there have been various attempts to develop an efficient and simple brushless DC motor, i.e., a motor which does not depend on physical contact between the rotor and the stator in the commutation mechanism. In such brushless DC motors, it has been found that efficient motor operation may be achieved by utilizing a permanently magnetized rotor in connection with a plurality of stator windings. As a selected stator winding is energized, the rotor is turned so as to reduce the torque angle which then exists between the stator field and the magnetic field of the rotor. This turning or rotation of the rotor is maintained by sequentially energizing the stator windings so that a large torque angle exists at all times. In such a case, the relative position of the rotor with respect to a stator winding must be sensed so that the electronic commutator will activate the desired stator windings at a rate proportional to rotor angular velocity. One attempt at accurate rotor position sensing is through the use of stationary inductive pick-up coils which have voltages induced in them as a result of the rotation of the permanently magnetized rotor. However, one disadvantage of such a coil arrangement is that the motor is not self-starting, and elaborate mechanisms are needed to provide the desirable self-starting features. For example, see U.S. Patent No. 2,753,501, issued July 3, 1956. Various other methods of sensing rotor position are discussed in an article by Wilson and Trickey entitled, "DC Machine with Solid State Commutation," which appears in the November 1962 issue of Electrical Engineering. However, a practical means of sensing rotor position in combination with an accurate and reliable electronic commutator has not yet been fully developed.

Accordingly, it is an object of this invention to provide an improved self-starting DC brushless motor.

It is a further object to provide an improved electronic commutator which contains a beam switching tube responsive to a pulse input.

It is still another object of this invention to provide an electron beam switching tube commutator driven by a pulse input, the input pulse rate being responsive both to rotor position and to rotor angular velocity.

It is yet another object of this invention to provide a rotor position sensing device for a brushless motor which utilizes a single photodiode in connection with the plurality of stator windings.

The above objects are achieved in the motor of the instant invention by the use of an electronic beam switching device having a plurality of outputs. The electron beam is sequentially switched to succeeding outputs by means of a pulse input switching means controlled by a variable frequency oscillator. The oscillator is in turn responsive to control signals from both a transducer device and from a rotor position sensing device. The brushless motor thus utilizes an electronic commutator consisting of a minimum of components, which provides a commutation process responsive to both rotor angular velocity and rotor position.

Other objects as well as the advantages and features of the present invention will, of course, become apparent and immediately suggest themselves to those skilled in the art to which the invention is directed from the reading of the following detailed description in connection with the accompanying drawings in which:

FIGURE 2 is a schematic diagram of the synchronizing circuit and variable frequency oscillation circuit shown in FIGURE 1; and FIGURE 3 is a schematic diagram of a preferred embodiment of the armature switches shown in FIGURE 1.

Figure 1:
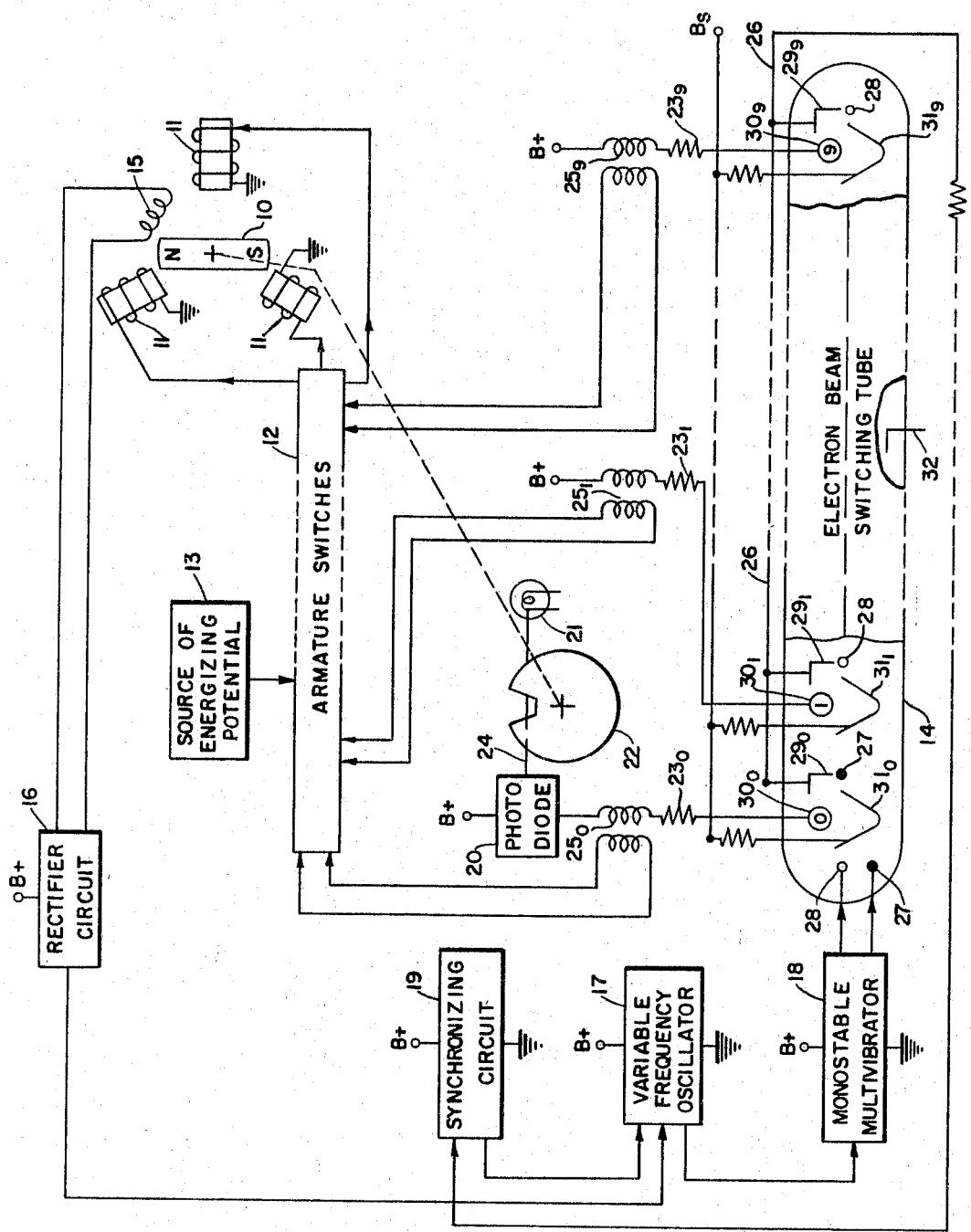
FIGURE 1 is a partial block diagram of the subject matter of the invention.

Referring now to the drawings, in FIGURE 1 stator windings 11 are sequentially energized from a suitable DC potential source 13 by means of armature switches 12. In order to effect efficient motor operation, the armature switches must be activated in such an order that a large torque angle exists at all times between the magnetic field of a permanently magnetized rotor 10 and the magnetic field of any one energized stator winding. To achieve this end, armature switches 12 are activated sequentially by output pulses present at outputs $30_0$ to $30_9$ of an electron beam switching tube 14. The tube 14 comprises a plurality of arrays and a cathode 32. Each array consists of an output 30, a spade 31, a shield grid 29, and either an odd 27 or even 28 switch grid; and it is noted that the number of arrays utilized in a particular application is determined by the number of stator windings 11 which are to be sequentially activated. Output pulses present at outputs $30_0$ to $30_9$ are coupled through pulse transformers $25_0$ to $25_9$ (one such transformer for each output) to armature switches 12. The armature switches (one such switch for each stator winding in a particular embodiment) are utilized so that, when activated by outputs from pulse transformer $25_0$ to $25_9$, energizing potential from a source 13 may be gated to a particular stator winding 11. Thus, tube 14 acts as a distributor to provide output pulses in the proper sequence to the armature switches 12.

The armature switches 12 in the preferred embodiment consist of a series of silicon controlled rectifiers responsive to pulses from pulse transformers 25. In such an embodiment the number of silicon controlled rectifiers would be dependent upon the number of stator poles in a particular motor. However, switching diodes or switching transistors may be used as the armature switches in the instant invention, as well as any other desirable combination of relays or gates which are responsive to the output of pulse transformers 25.

The electron beam in tube 14, which is formed between cathode 32 and any one of outputs $30_0$ to $30_9$, is transferred to a succeeding output upon the receipt by switch grids 27 and 28 of input switching pulses. As shown in FIGURE 1, a monostable multivibrator 18 is connected to switch grids 27 and 28. The monostable multivibrator 18 typically provides a pulse of approximately 50 microsecond duration and is connected such that when triggered, the lead portion of the pulse activates the odd grid 28 and the reset portion of the pulse activates even grid 27. A typical monostable multivibrator which may be utilized is based upon a design by Fung and Nambiar as illustrated on page 44 in Electronic Design (Nov. 22, 1962).

The multivibrator 18 is triggered, so as to produce its signals for activation of grids 27 and 28, by a variable frequency oscillator 17, which is shown and described in the discussion of FIGURE 2; however, it is noted that the the output frequency of the voltage controlled oscillator 17 is variable depending upon the amplitude of the variable DC voltage derived from a rectifier circuit 16. (The frequency range of oscillator 17 should be such that both maximum r.p.m. for a particular application and re-start from stall condition may be achieved.) In a particular embodiment, a voltage controlled oscillator with a range of 50 to 660 pulses per second triggering a monostable multivibrator with a pulse duration of 50 microseconds was capable of producing a speed of 8000 r.p.m. for a 10 stator pole motor. The variable control voltage for the oscillator 17 is provided by a stationary transducer 15, situated on the periphery of the stator. The transducer 15 preferably is an inductive pick-up coil which has a voltage induced in it as a result of the rotation of the magnetized rotor 10, the magnitude of the induced voltage therein being proportional to the rotor angular velocity. As a result, the output from the rectifier circuit 16 is a variable DC voltage whose level is indicative of rotor angular velocity. Therefore, the output frequency oscillator 17 is automatically controlled by rotor angular velocity. This results in accurate commutation and in a smooth increase in rotor angular velocity during the self-start from stall condition.

As previously mentioned, an accurate method of sensing rotor position is desirable so that the correct stator winding will be energized in proper sequence by the action of the armature switches 12. In the instant invention an indication of the position of the rotor with respect to the stator windings is achieved as a result of the illumination of a photodiode 20 by a beam of light 24. The photodiode 20 is activated only when a rotatable shutter 22 allows the light beam from lamp 21 to impinge on it. At other portions of the shutter rotation the beam 24 is blocked by the shutter, which rotates in response to rotor motion; and the non-illumination of the photodiode 20 results in an open circuit between output $30_0$ and supply voltage B+. Thus, at those portions of the rotor cycle in which the light beam cannot activate photodiode 20, the potential between $30_0$ and ground is at a minimum due to the open circuit between $30_0$ and B+. The effect which this small potential drop at $30_0$ has on the operation of beam tube 14 will be discussed in more detail in relation to FIGURE 2.

In connection with the operation of the position sensor, it is noted that, if the potential between output $30_0$ and ground is below a predetermined value, substantially all of the beam current will be diverted to shield grid $29_0$. This results in an output by way of electrical connection 26 to the input of synchronizing circuit 19 which will be explained more fully in connection with FIGURE 2. As may be seen in FIGURE 1, the output of synchronizing circuit 19 is coupled to the input of oscillator 17. Upon receipt of an input, synchronizing circuit 19 biases oscillator 17 to cut off and this cut-off or standby condition is maintained as long as there is an input to synchronizing circuit 19. In this manner the triggering of the monostable multivibrator 18 by oscillator 17 is dependent upon rotor position, which position is indicated by the presence or absence of an input to synchronizing circuit 19. Therefore, accurate synchronism of the commutation process is provided.

The beam switching tube 14 used as the electronic commutator in this invention is best seen in FIGURE 1. In a particular embodiment of the invention a "BEAM-X" model 2,000 ten-position electron switching tube supplied by the Burroughs Corporation was used; however, any comparable tube which is capable of beam switching in response to input pulses in addition to providing a secondary output is within the scope of this invention. For a further reference to the particularities of the "BEAM-X" tube attention is directed to the "BEAM-X" Technical Brochure No. BX 535B available from the Burroughs Corporation.

As stated above, each target position of tube 14 consists of an identical array of four elements. Each array consists of a spade 31, biased by a spade supply voltage $B_s$, the spades being needed in order to form and lock the beam on the outputs $30_0$ to $30_9$. The section entitled, "Beam Forming and Locking" on page 5 on the above cited brochure further discusses the characteristics of such brochure further discusses the characteristics of such spades or beam locking devices. Also each array contains an output $30_0$ to $30_9$ which correspond to the output electrodes in conventional beam switching tubes. In addition, each array includes a secondary output or shield grid $29_0$ to $29_9$ which will conduct output current should the potential drop at its associated output 30 fall below spade buss voltage. A further discussion of the advantages and uses of the shield grids $29_0$ to $29_9$ is contained in the section entitled, "Output" on page 5 of the above cited brochure with special reference to the discussion of FIGURE 8. However, it is noted that the details of the tube itself form no part of the invention. Therefore, it is sufficient for purposes of this invention to state that a predetermined potential decrease at the output $30_0$ results in the conduction of output current by shield grid $29_0$.

Each array further contains either an odd or even switch grid 27 or 28 which serve, when activated by pulses from multivibrator 18, to transfer the beam to a succeeding output $30_0$–$30_9$. For example, if initially the electron beam from cathode 32 is locked on output $30_1$ by spade $31_1$, and if a pulse then is received on switch grid 28 from multivibrator 18, the beam will be advanced to target $30_2$. Should the system be in synchronism, the above sequential switching operation will continue as long as pulses are applied to grids 27 and 28. If synchronism is lost during the time the beam is switched from output $30_9$ to output $30_0$, the potential drop at output $30_0$, due to the absence of photodiode action, will fall below spade buss voltage. This causes shield grid $29_0$ to conduct output current. An output will appear on electrical connection 26 which output, via synchronizing circuit 19, will cause cut off of the oscillator 17 as will be more fully explained below. Thus, the electron beam from cathode 32 will not be advanced since grids 27 and 28 will receive no input switching pulses. As soon as the photodiode 20 is illuminated, the beam current will be diverted from $29_0$ back to $30_0$; the input to circuit 19 will be removed from electrical connection 26, and the sequential pulsing of switch grids 27 and 28 will resume.

Referring now to FIGURE 2, which illustrates the various components contained in synchronizing circuit 19, oscillator 17 and rectifier circuit 16, should an output appear on electrical connection 26 as a result of beam current diversion to shield grid $29_0$, transistors 50 and 51 will conduct. These transistors together with their appropriate biasing arrangements comprise synchronizing circuit 19. When the transistors 50 and 51 conduct, a pulse is fed via resistor 53 to the emitter of a unijunction transistor 54 causing cut-off of the transistor 54. Transistor 54, which is connected in an oscillator circuit, comprises variable frequency oscillator 17. (The unijunction transistor used in the particular embodiment was a General Electric Silicon Unijunction transistor (2N491A) connected in an oscillator circuit based on General Electric Transistor Manual (5th edition) recommendations. However, any suitable voltage controlled oscillator consistent with design may be used.) A capacitor 56 is provided in the discharge path of transistor 51 so as to prevent the triggering of multivibrator 18 by transistor 54 from stopping completely in the case of a stalled rotor. Thus, in the case in which synchronism is lost due to rotor stalling, the transistor 54 will initially be cut off by the output from $29_0$. However, due to the discharge path provided by capacitor 56, the oscillator 17 will begin to oscillate, after a predetermined interval, at the lower value of the oscillator frequency range.

The emitter of transistor 54 is additionally coupled to the output of rectifier circuit 16 via resistor 52. The rectifier circuit 16 contains a plurality of diodes 70–73 interconnected by a capacitor 74 as shown in FIGURE 2. It is noted that the necessary ground connection is provided between diodes 70 and 71. The variable DC level present at the junction of diodes 72 and 73 (which as has been stated is proportional to rotor angular velocity) is a control voltage which varies the output frequency of the voltage controlled oscillator circuit containing transistor 54. Thus, an increase in the magnitude of the voltage generated in transducer 15 results in an increase in frequency of the output wave. The output from the transistor 54 is coupled to the input of the multivibrator 18 as previously discussed.

In operation, the electron beam is initially formed by suitably applying power to the tube 14. The use of the term self-starting in connection with the brushless DC motor indicates that the motor will automatically re-start and will self-start from stall condition. It does not mean that the motor will start without initially energizing the tube so as to form an electron beam. Input pulses to the monostable multivibrator 18 from oscillator 17 (for example, at 50 pulses per second) trigger the multivibrator 18, causing input switching pulses to appear at switch grids 27 and 28. The electron beam thus is transferred to succeeding outputs $30_0$–$30_9$ with resulting rotor motion due to the presence of a torque angle. This operation continues until the beam is advanced to output $30_0$. Then should the potential drop to ground at output $30_0$ (which drop is dependent on the value of resistance of $23_0$ and that of photodiode 20) be below a desired value (due to the non-illumination of diode 20), the synchronizing circuit 19 causes cut off of oscillator 17. The cut off condition continues until the shutter 22 allows a light beam 26 to impinge on the photodiode 20. The resulting photodiode activation increases the potential drop between output $30_0$ and ground and output $30_0$ conducts beam current. Then, synchronizing circuit 19 is no longer capable of cut off of oscillator 17, and the sequential switching of armature windings 12 is again possible. Rotor angular velocity increase is marked by an increase in the magnitude of the voltage induced in transducer 15 which results in a greater output frequency from oscillator 17.

A preferred embodiment, which utilizes silicon controlled rectifiers as the armature switches, is shown in FIGURE 3. In such a case, silicon controlled rectifier 61 will be turned on in response to an output from pulse transformer $25_0$ and will gate energizing potential to the corresponding stator winding even after the pulse from transformer $25_0$ is removed. In order to turn off silicon controlled rectifier 61, a coupling capacitor 63, connected between the cathode of silicon controlled rectifiers 61 and 62, is provided. Thus, upon receipt of a pulse by silicon controlled rectifier 62, a corresponding stator winding is energized, and a pulse is coupled back to the cathode of silicon controlled rectifier 61. This pulse raises the cathode potential of silicon controlled rectifier 61 to bias potential (B+) and the holding current necessary to maintain silicon controlled rectifier 61 conducting is destroyed. Therefore, silicon controlled rectifier 61 will be turned off and will remain non-conducting until triggered again by a pulse from the pulse transformer $25_0$.

The advantages of this invention are numerous, and the motor is especially adapted for use in the vacuum conditions such as exist in a satellite. Since the motor is self-starting and operates from a direct current source, the machine may be in unmanned spacecraft which operate from solar energy and battery sources or in other applications wherein arcing may be detrimental in the particular environment of the motor. The use of the "BEAM-X" tube in connection with silicon controlled rectifier armature switches provides a lightweight and accurate electronic commutation system using a minimum of components.

It is to be understood that the foregoing disclosure relates to a preferred embodiment of the invention, and numerous modifications can be made without departing from the spirit and scope of the invention as defined in the appended claims.

What is claimed is:

1. A brushless DC motor including a permanently magnetized rotor and a plurality of stator windings; a plurality of switches, said switches coupling said windings to a source of energizing potential; an electronic beam switching device having a plurality of switch grids, and a plurality of outputs, said outputs being coupled to said swtiches; a pulse input switching means having an output; rotor position sensing means having an output coupled to said pulse input switch means, the output of said pulse input switching means being coupled to said plurality of switch grids of said beam switching device, whereby the plurality of switches may be activated by said beam switching device in sequential order in response to said pulse input switching means.

2. A motor as described in claim 1 wherein said switching device comprises a beam switching tube, said tube including a cathode for producing an electron stream, and a plurality of identical arrays; each array comprising at least one of said plurality of outputs, and one of said plurality of switch grids, whereby said electron stream from said cathode to one of said plurality of outputs can be transferred to a succeeding output in response to said input switching means.

3. The motor as described in claim 1 further including a transducer means for measuring the angular velocity of said rotor, and a variable frequency oscillation means coupled between said transducer means and said pulse input switching means for controlling the activation of said pulse input switching means whereby variations in said transducer means due to changes in rotor angular velocity control the output frequency of said oscillation means.

4. The motor as described in claim 3 wherein said transducer means comprises a stationary inductive pick-up means positioned such that variations in the angular velocity of said permanently magnetized rotor change the magnitude of a voltage induced in said pick-up means.

5. The motor described in claim 3 further including synchronizing means coupled between said rotor position sensing means and said oscillation means whereby said synchronizing means controls the cut-off of said oscillation means in accordance with rotor position.

6. The motor described in claim 5 wherein said rotor position sensing means includes a photodiode means and a rotatable shutter means connected to said permanently magnetized rotor such that said photodiode means is activated only at a particular rotor position, whereby the sequential activation of said plurality of switches is synchronized with a particular rotor position.

7. In a DC brushless motor having a permanently magnetized rotor and a plurality of stator windings; a plurality of switches, said switches upon activation coupling said windings to a source of potential; an electron commutating means including in combination: an electron beam switching device having a plurality of switch grids, and a plurality of outputs, each output being coupled to a selected one of said switches; pulse input switching means having an output; rotor position sensing means having an output coupled to said pulse input switching means, the output of said pulse input switching means being coupled to said switch grids, whereby said pulse input switching means causes sequential activation of said plurality of outputs of said electron beam switching device so as to energize said stator windings through control of said switches in a selected order.

8. The combination as described in claim 7 wherein said electron beam switching device comprises a beam switching tube, said tube including a cathode and a plurality of identical arrays; each array comprising at least one of said plurality of outputs, and one of said plurality of switch grids whereby said electronic stream from said cathode to one of said plurality of outputs can be transferred to a succeeding output in response to said input switching means.

9. The combination as described in claim 7 further including a variable frequency oscillation means; and a transducer means for measuring the angular velocity of said rotor; said oscillation means being coupled between said transducer means and said pulse input switching means for controlling the activation of said pulse input switching means whereby a change in rotor angular velocity varies the output frequency of said variable frequency oscillation means.

10. The combination as described in claim 9 wherein said transducer means comprises a stationary inductive pick-up means positioned such that the magnitude of a voltage induced in said pick-up means is proportional to rotor angular velocity.

11. The combination described in claim 9 further including a synchronizing means coupled between said rotor position sensing means and said variable frequency oscillation means whereby the cut off of said oscillation means is controlled by rotor position.

12. The combination as described in claim 11 wherein said rotor position sensing means comprises a stationary photodiode means connected in one selected output of said plurality of outputs of said beam switching device, and a rotatable shutter means mechanically connected to said rotor and positioned such that said photodiode means is activated by a light beam at only one rotor position, whereby the sequential activation of said plurality of outputs of said electron beam switching device is synchronized with a particular rotor position.

13. The combination as described in claim 12 wherein said beam switching device comprises a beam switching tube, said tube including a cathode and a plurality of identical arrays, each array comprising a beam locking device, one of said plurality of outputs, a shield grid, and one of said plurality of switch grids; and wherein said synchronizing means includes a switching transistor having an input coupled to a selected one of said shield grids; whereby a voltage drop in the selected output which contains the photodiode means, due to non-illumination of said photodiode means, causes the beam current of the electron beam formed between said cathode and the selected output to be diverted to the selected shield grid associated with said selected output thereby causing said transistor to conduct so as to cause cut-off of said oscillation means.

14. The combination as described in claim 13 wherein said pulse input switching means comprises a monostable multivibrator and said transducer means comprises a stationary inductive pick-up means positioned so that the magnitude of a voltage induced in said pick-up means is proportional to rotor angular velocity.

References Cited
UNITED STATES PATENTS

| | | | |
|---|---|---|---|
| 2,866,931 | 12/1958 | Formby | 318—254 |
| 3,096,467 | 7/1963 | Angus et al. | 318—138 |
| 3,189,808 | 6/1965 | Henry-Baudot | 318—138 |
| 3,214,663 | 10/1965 | Kreutzer | 318—138 |

ORIS L. RADER, *Primary Examiner.*

G. SIMMONS, *Assistant Examiner.*